US007853898B2

United States Patent
Clark et al.

(10) Patent No.: US 7,853,898 B2
(45) Date of Patent: Dec. 14, 2010

(54) METHOD AND APPARATUS FOR MANAGING IMAGE DISPLAY IN A DIGITAL IMAGE DISPLAY APPARATUS

(75) Inventors: Timothy Pressler Clark, Rochester, MN (US); Zachary Adam Garbow, Rochester, MN (US); Kevin Glynn Paterson, San Antonio, TX (US); Richard Michael Theis, Rochester, MN (US); Brian Paul Wallenfelt, Rocherster, MN (US)

(73) Assignee: International Business Machines Corporation, Armonk, NY (US)

( * ) Notice: Subject to any disclaimer, the term of this patent is extended or adjusted under 35 U.S.C. 154(b) by 1426 days.

(21) Appl. No.: 11/282,031

(22) Filed: Nov. 17, 2005

(65) Prior Publication Data
US 2007/0109598 A1 May 17, 2007

(51) Int. Cl.
*G06K 15/00* (2006.01)
(52) U.S. Cl. .................... 715/840; 715/838; 715/811
(58) Field of Classification Search ................ 715/835, 715/840, 841, 838, 811
See application file for complete search history.

(56) References Cited

U.S. PATENT DOCUMENTS

| 6,538,698 | B1* | 3/2003 | Anderson ............... 348/333.05 |
| 6,810,149 | B1* | 10/2004 | Squilla et al. ............... 382/224 |
| 7,415,662 | B2* | 8/2008 | Rothmuller et al. ......... 715/200 |
| 2003/0154190 | A1* | 8/2003 | Misawa et al. ................ 707/1 |
| 2003/0174217 | A1* | 9/2003 | Kito et al. ............... 348/231.2 |
| 2003/0189652 | A1* | 10/2003 | Takayama .............. 348/231.99 |
| 2004/0100505 | A1* | 5/2004 | Cazier ....................... 345/811 |
| 2004/0172440 | A1* | 9/2004 | Nakajima et al. .......... 709/200 |
| 2005/0050043 | A1* | 3/2005 | Pyhalammi et al. .......... 707/6 |
| 2005/0192924 | A1* | 9/2005 | Drucker et al. ............... 707/1 |
| 2005/0216186 | A1* | 9/2005 | Dorfman et al. ........... 701/207 |
| 2006/0090141 | A1* | 4/2006 | Loui et al. ................. 715/764 |
| 2006/0200475 | A1* | 9/2006 | Das et al. ................... 707/100 |

* cited by examiner

*Primary Examiner*—William L Bashore
*Assistant Examiner*—Daeho D Song
(74) *Attorney, Agent, or Firm*—Roy W. Truelson

(57) ABSTRACT

A digital device automatically arranges digital images for display in a stack-based arrangement, wherein images are grouped in multiple stacks according to at least one grouping criterion, and the user can scroll over groups of images. Preferably, the digital device automatically selects a mascot image from each group as the top of the corresponding stack. When the images are displayed using a digital display apparatus, the user can scroll through the mascot images only, without reviewing the other images in each stack. When the user finds a mascot image of interest, he may optionally scroll down the images in the stack. Preferably, images are grouped according to power-on session, and mascots are chosen based on user interaction history.

15 Claims, 8 Drawing Sheets

METHOD AND APPARATUS FOR MANAGING IMAGE DISPLAY IN A DIGITAL IMAGE DISPLAY APPARATUS

FIELD OF THE INVENTION

The present invention relates to digital data devices, and in particular to the operation of digital cameras, portable digital display devices, digital computers, and the like which store and display digitally captured optical images.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The declining prices and expanding capabilities of modern digital technology has caused it to be used in an ever increasing variety of applications. One of these applications has been the capturing of optical images. Optical imaging technology generally uses a digital sensor array, such as a charge-coupled device (CCD) array, having a large number of photo-sensitive elements arranged in a regular pattern, and appropriate supporting hardware which scans the output of the elements and constructs therefrom a digital image. The digital image can then be stored in any digital data storage medium, displayed on a digital display device, printed on paper or other medium, manipulated using editing tools, or transmitted to remote locations using any transmission medium appropriate for digital data.

Optical imaging has been used in a variety of settings, including fax machines, document scanners, bar code readers, and so forth. In particular, digital optical imaging is also used as a substitute for older film-based media in high-resolution still and motion picture cameras. Indeed, as digital optical technology improves in quality and declines in price, many foresee the day when it will completely supplant the older film-based media in these fields.

A digital camera, whether still or motion video, typically contains an on-board processor, which can be programmed to perform a variety of functions. Among other things, the processor can be programmed to embed supplementary information in the digital image. It is known, for example, to embed a date and time at which the image was captured. Date and time is easily established by maintaining an on-board digital clock in the camera. Embedding such supplementary information is not particularly difficult once it is obtained.

Most digital cameras to date have simply tried to mimic the capabilities of their mechanical device counterparts, making limited use of digital technologies other than simple optical scanning and recording. Such an approach fails to recognize the vast potential of the information age to provide improved integration of digital technology and enhanced function of digital cameras not yet conceived, a potential which is bounded only by human imagination.

One area in which conventional digital cameras and other devices fail to live up to their potential is in the management of multiple captured digital images. Modern digital cameras are capable of storing multiple images on digital media, such as compact flash cards. The convenience and low cost of digital photography encourages users to capture and accumulate a large number of such images. Often, a user will take multiple successive images of the same subject in order to assure that at least one good image is captured, or to record successive stages of an unfolding event. The proliferation of such images makes their organization and management difficult.

In older film-based cameras, photographs are usually individually printed on paper, and the user may optionally arrange the printed photographs in some form of book or other holding device. The same option exists with digital photographs. However, because most users capture a large number of digital images, such images are often kept in digital storage displayable only with a digital device, without being printed on paper.

When a large number of digital images are maintained in a digital storage medium, it often becomes difficult to conveniently view selective images or images in a desired order. When captured, images are normally stored in digital storage media in a sequential order for presentation. This means that, when presenting the digital images from digital storage media, the user must view them in sequential order. The user may have to view a large number of images which are duplicative or otherwise of little interest to find one or a relatively smaller number of images of interest.

It is possible to download such images to a digital computer or other device, and to edit the images for presentation in any desired order using any of various conventional digital image management programs. However, downloading and arrangement of a large number of digital images using such software is very time consuming. As a result, many users do not select and arrange their stored images in a logical presentation order. Instead, such users may simply accumulate images in one or more digital storage devices.

A need therefore exists, not necessarily recognized, for improved devices or techniques for managing and presenting multiple digital optical images captured by a digital camera or similar apparatus.

SUMMARY OF THE INVENTION

A digital device automatically arranges digital images for display in a stack-based arrangement, wherein images are grouped in multiple stacks according to at least one grouping criterion. When the images are displayed using a digital image display apparatus, the user can scroll through groups of images, without reviewing all the images within each group. When the user finds a group of interest, he may optionally scroll down into all the images in the corresponding stack.

In one aspect of the preferred embodiment, the digital device automatically selects an image from each group (known as the "mascot image") as the top of the corresponding stack. When scrolling through groups of images, the device displays only the mascot image of each respective group. The user can display the other images within a group by selecting a different scroll mode to scroll down into the group.

In another aspect of the preferred embodiment, the images are grouped according to power-on session, i.e. all images captured in the same power-on session are grouped together by default. Various alternative criteria could be used for image grouping, and in a further alternative the user may specify, through one or more options, any of multiple different criteria to be used for automatically grouping images. Criteria which may serve as a basis for automatic grouping of images may include, but are not necessarily limited to, one or more of the following: automatic color analysis or image analysis, global positioning and/or direction of the camera when the image was captured, camera power-on/power-off session, and date and time the image was captured. Optionally, the user may also specify a manual override or manual grouping of one or more images.

In the preferred embodiment, the device automatically selects a mascot image based on user interaction history, specifically, the cumulative time an image was viewed and the number of zoom operations performed on an image while being viewed. As in the case of groupings, alternative criteria could be used, and a user may specify a manual override or manually designate a mascot.

A method and apparatus described herein provides an enhanced image display interaction with the user, which is particularly useful where the user acquires a large collection of images and does not take the time to manually organize these images. The method and apparatus described herein will organize the images in an intelligent manner which is, for many purposes, better than the sequential organization in which images are normally organized by default in conventional image viewing apparatus, while still permitting the user to manually override any automatic determinations if the user is so inclined.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Invention Overview

Figure 1:
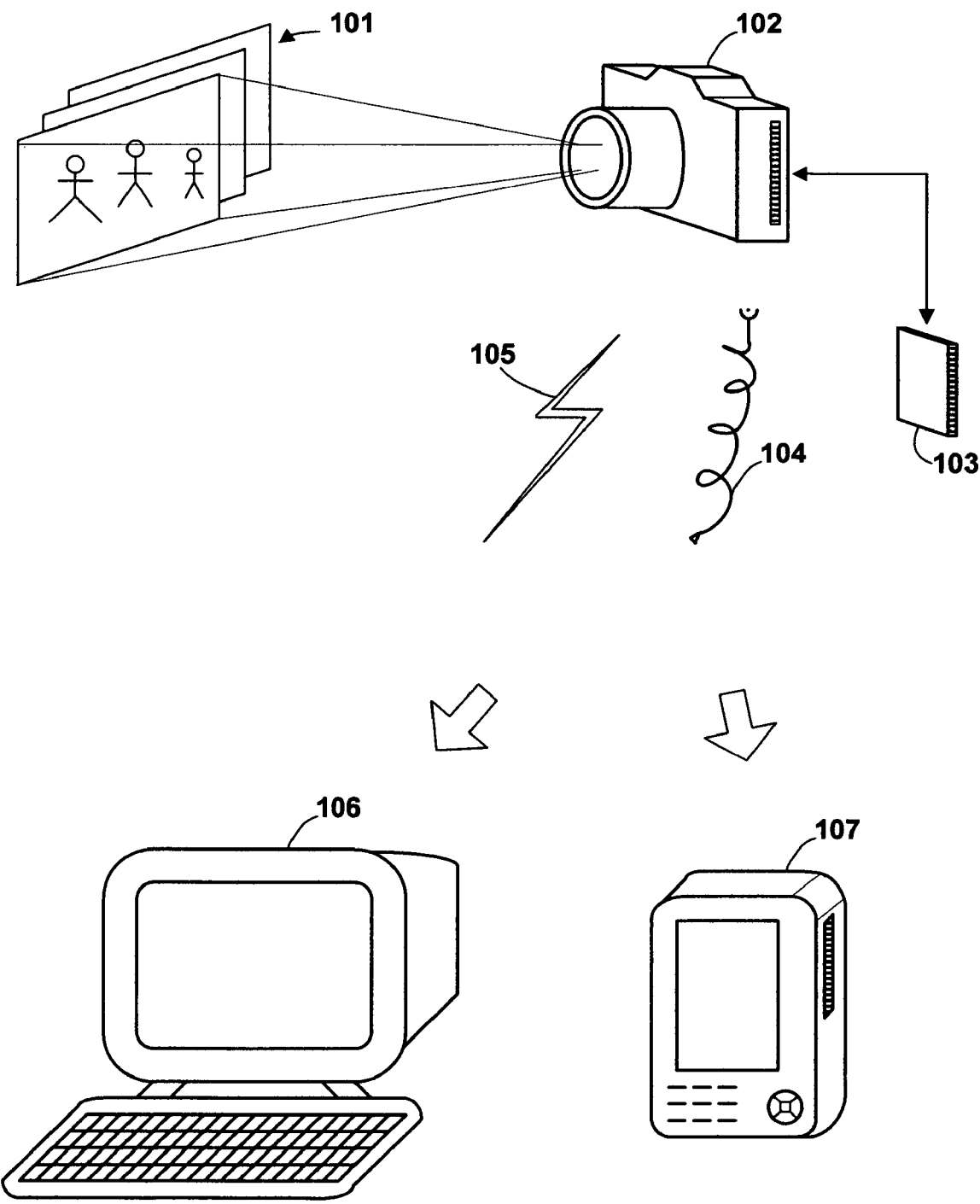
FIG. 1 is a representation of an environment for capturing and displaying digital images, according to the preferred embodiment of the present invention

The invention herein relates to a method and apparatus for automatically grouping digital images for display, and can be practiced using a variety of digital data devices, either alone or in cooperation with other digital data devices. A generalized environment for capturing and displaying digital images is shown in FIG. 1. As is well known, multiple digital images 101 are captured with a digital image capture device, preferably digital camera 102, which may be designed to capture still images and/or motion video. The images may be stored in the camera in an internal storage device or on removable media 103. The images may be transmitted to another digital device (such as desktop computer system 106 or handheld personal digital assistant 107), either by physically removing the removable media 103 from the camera and placing in the other digital device, or by transmitting the image over a cable 104, or by transmission over a wireless link 105. The images are typically stored in the camera before transmission, but in some cameras the images may be transmitted as they are captured, without being stored persistently in the camera. If an image is transmitted to another digital device, it may be copied and/or transmitted further to still other digital devices.

At some point, a user will want to see the digital images. The images may be printed on paper or other media and manually organized in any desired manner, but it is increasingly common to display digital images from an electronic display apparatus. Such a display apparatus may range from a large projection screen to a cathode ray tube monitor of a desktop 106 to a liquid crystal diode (LCD) display of a handheld device, such as handheld personal digital assistant 107, and specifically may include a display (usually an LCD display) of the digital camera 102 itself. Although a desktop 106 and a handheld personal digital assistant 107 are shown and described herein, it will be understood that the present invention is not limited to display in any particular type of digital device, and that a device which displays and/or groups images for display may, but need not be, handheld; it may be the camera, some other special purpose device, a laptop or desktop computer, or could even be a larger system or a network of systems in which some of the tasks are performed by different devices or systems.

The automatic grouping of digital images for display may be performed by a digital device which captures the digital image (e.g. digital camera 102), or by a digital device which displays the digital image, or by a separate digital device which is neither the digital image capturing device nor the digital image display device. Furthermore, the capturing, automatic grouping, and displaying of digital images may all be performed in a single device (a digital camera with a small display for showing captured images), or may be performed in separate devices, or two of these tasks may be performed in a single device while the other is performed in a separate device. In the preferred embodiment described herein, which is merely one exemplary embodiment of many possible embodiments, the digital image is captured, grouped and displayed in a single digital device, i.e., digital camera 102.

DETAILED DESCRIPTION

Figure 2:
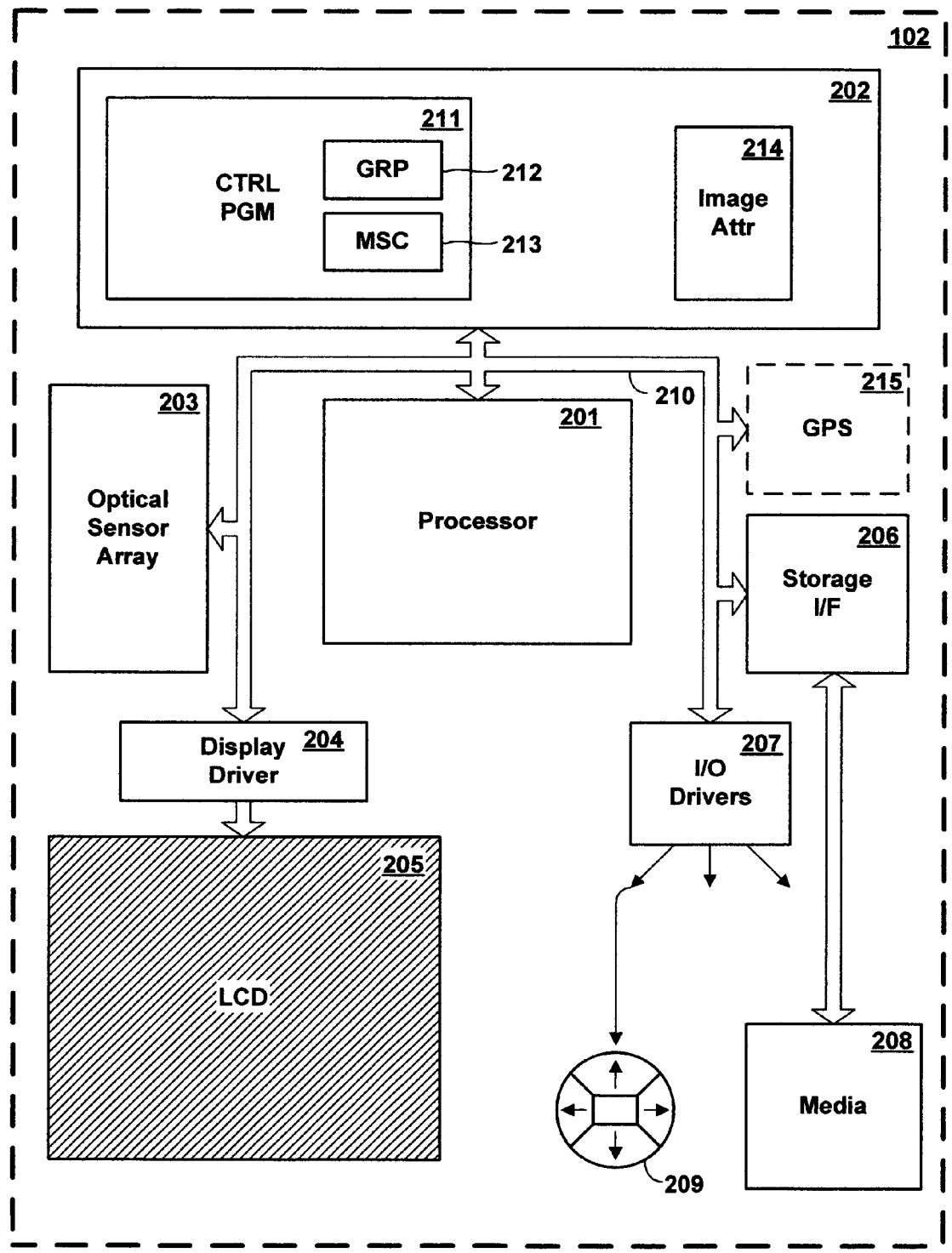
FIG. 2 illustrates the major electronic components of a digital camera, according to the preferred embodiment.

FIG. 2 is a high-level block diagram of the major electronic components of a digital camera 102 for capturing, managing and displaying digital images, according to the preferred embodiment. Camera 102 includes a programmable processor 201 which executes a control program 211 resident in internal random access memory 202 to generally control the operation of the camera's components. Camera 102 further includes optical sensor array 203 for capturing digital images; display driver 204 and LCD display 205 for displaying images and other information; storage interface 206 for communicating with storage media 208; I/O device driver/controller 207 for communicating with various other components of the camera; and optional global positioning unit 215 for recording respective global positioning data as an attribute of each captured image; all of which are under the control of processor 201. One or more communications buses 210 support communication among the various electronic components. Bus 210 is represented for clarity in FIG. 2 as a single entity, although it may in fact be multiple buses, bus interfaces, and associated components. Power to these various electronic components is supplied by a battery (not shown).

Storage media 208 may be any appropriate storage media used for storing digital images, such as semiconductor memory, magnetic tape, magnetic disk, optical memory, etc. The storage media is preferably removable media, although it need not be. Media 208 is used primarily for storing digital images captured by optical sensor array 203; however, it can store additional information, in particular data associated with each respective image, such as a sequence number, date and time the image was captured, camera settings, and so forth. In the preferred embodiment, certain additional information is stored with respect to each image, as described herein.

I/O device driver controller 207 provides an interface to other camera components (not necessarily shown in FIG. 2). These components include those controlled by processor 201, such as shutter, lens, mirrors, etc, as well as those from which processor 201 receives input, such as a shutter actuator button, or other user accessible buttons and switches. In particular, in accordance with the preferred embodiment the I/O device driver controller 207 detects user input from a set of scroll function input buttons 209, comprising an up arrow, a down arrow, a left arrow and a right arrow, which are used to make user selections from menus and so forth. Additionally, there will usually be at least one external port for transmitting data to a digital device external to the camera, such as desktop computer 106 or personal digital assistant 107.

Memory 202 contains a control program 211 comprising a plurality of processor-executable instructions which, when executed on processor 201, control the operation of the camera. Memory 202 preferably includes at least a portion which is strictly non-volatile, i.e., the data in the non-volatile portion is not lost in the event the memory receives no power, whether due to battery failure, replacement, or other event. Control program 211 is preferably stored in this portion of memory. Memory 202 may also include a volatile or dynamic portion for storing temporary values, counters, etc., or for buffering image data, which depends on the presence of battery power. Depending on the design, this volatile portion may be protected from data loss by a small back-up battery, capacitor, or other means.

Control program 211 performs all the conventional functions typically required to control the operation of camera 102. The control program receives user input from various sources, as well as sensor input from light meters, distance measuring sensors, and so forth. Using this input, the control program controls camera functions such as shutter, flash, focus, aperture, etc., as is known in the art. The control program also controls auxiliary functions, such as downloading of data to other digital devices, setting of camera parameters, deleting images, etc. In addition to these conventional features, control program 211 includes an image grouping function 212 for automatically grouping images, and a mascot determination function 213 for automatically determining a mascot image in a group of images. The operation of control program 211, and in particular its functions for displaying images including grouping images for display, and determining mascot images, is described in greater detail herein.

Control program 211 maintains attribute information 214 with respect to captured digital images. Attribute information is preferably stored in media 208 accompanying the images, but when the camera is powered on it is preferably loaded into memory 202 so that it is available to the control program. Attribute information may include conventional attributes such as, with respect to each image, a timestamp, such as a date and time that an image was captured, camera settings when the image was captured, a user-specified title, etc. Additionally, attribute information includes data which is useful in automatically grouping images and choosing a mascot image for each group. In accordance with the preferred embodiment, this attribute information includes, with respect to each image: (a) a power-on session identifier; (b) a user-specified group identifier; (c) a cumulative viewing time of the image; (d) a zoom operations count; and (e) a user-selected mascot flag. It would alternatively be possible to store other or additional attributes in attribute data 214 for use in grouping images or selecting mascot images, such as global positioning data generated by optional global positioning unit 215.

The power-on session identifier is a number which uniquely identifies a power-on session (i.e., a time interval in which the camera was continuously powered-on, between a single power-on operation, and the corresponding power-off operation), and is used to identify images captured during a common power-on session. A unique identifier is preferably obtained by incrementing a dedicated counter value each time the camera is powered on; this counter could have sufficient digits to last the predicted life of the camera, or could be a smaller number which is combined with, e.g., a date, to produce a unique session identifier. The user-specified group identifier is an arbitrary number assigned to a group of images which the user has indicated should be grouped together; preferably, a user-specified grouping, if one exists, overrides any automatic grouping made by the camera. The cumulative viewing time records the cumulative time a particular image has been displayed on the camera's display 205, and is used for automatically selecting a mascot image. The zoom operations count is a cumulative count of the number of zoom operations which have been performed while displaying the image, and is also used for automatically selecting a mascot. The user-selected mascot flag is a flag indicating that the user has specified a particular image as a mascot; preferably, such a user direction, where it exists, overrides any automatic mascot selection by the camera.

While a certain number of programs, functions and other entities are shown in memory 202, it will be understood that these are shown for purposes of illustration only, and that the actual number of such entities may vary. Additionally, while the software components of FIG. 2 are shown conceptually as residing in memory 202, it will be understood that some of these components may also be stored elsewhere, e.g. on media 208, and loaded into memory 202 as required.

In accordance with the preferred embodiment of the present invention, control program 211 automatically makes a default grouping of images, automatically selects a mascot for each group, and displays the images to the user. The user navigates the images in a stack-based fashion by either moving up or down a stack (moving from one image to another within a group) or moving from stack to stack (moving between groups, where the mascot image of each group is always displayed first).

Figure 3:
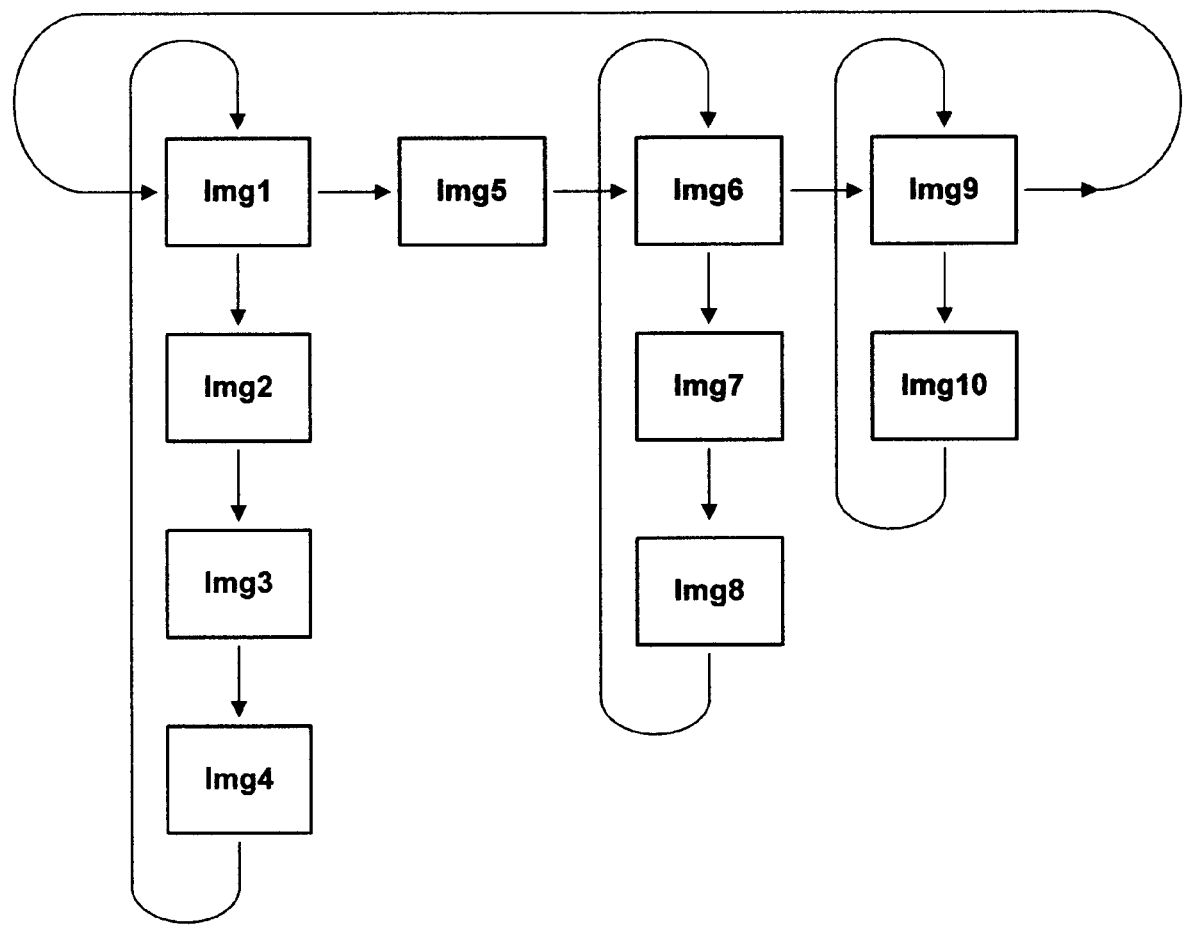
FIG. 3 is a conceptual view of stack-based navigation of grouped images, in accordance with the preferred embodiment.

FIG. 3 is a conceptual view of stack-based navigation of grouped images, in accordance with the preferred embodiment. FIG. 3 depicts ten images, numbered "Img1" through "Img10", grouped in four vertical stacks. The top of each stack represents a mascot image, i.e. Img1, Img5, Img6 and hmg9 are mascots.

Camera 102 contains scroll function input buttons 209, with which a user performs navigation. A user can navigate through images either by group or within a group. When navigating by group, the user sequentially views each respective mascot image of a group. I.e., when the user selects a next image with an appropriate scroll function input button (which is preferably the right arrow button), the next image displayed is the mascot image for the next group. Thus, by successively selecting next images with the right arrow, the user sees only the mascot images of the different groups, and images within a group which are not mascots are skipped. This capability allows the user to more rapidly scan through the images in storage to find some image or topic of interest. When the user finds a particular group of images of interest, as identified by its mascot, the user can scroll through the images within the group. Preferably, this is accomplished by successively pressing the down arrow button. The images within a group wrap to the beginning, so that when pressing the down arrow button after displaying the image at the bottom of the stack, the display returns to the mascot image. Similarly, the groups themselves wrap to the beginning, so that when pressing the right arrow button after displaying an image in the final group, the display returns to the mascot image for the first group. The left arrow button and up arrow button reverse the direction of the right arrow button and down arrow button, respectively.

Figure 4:
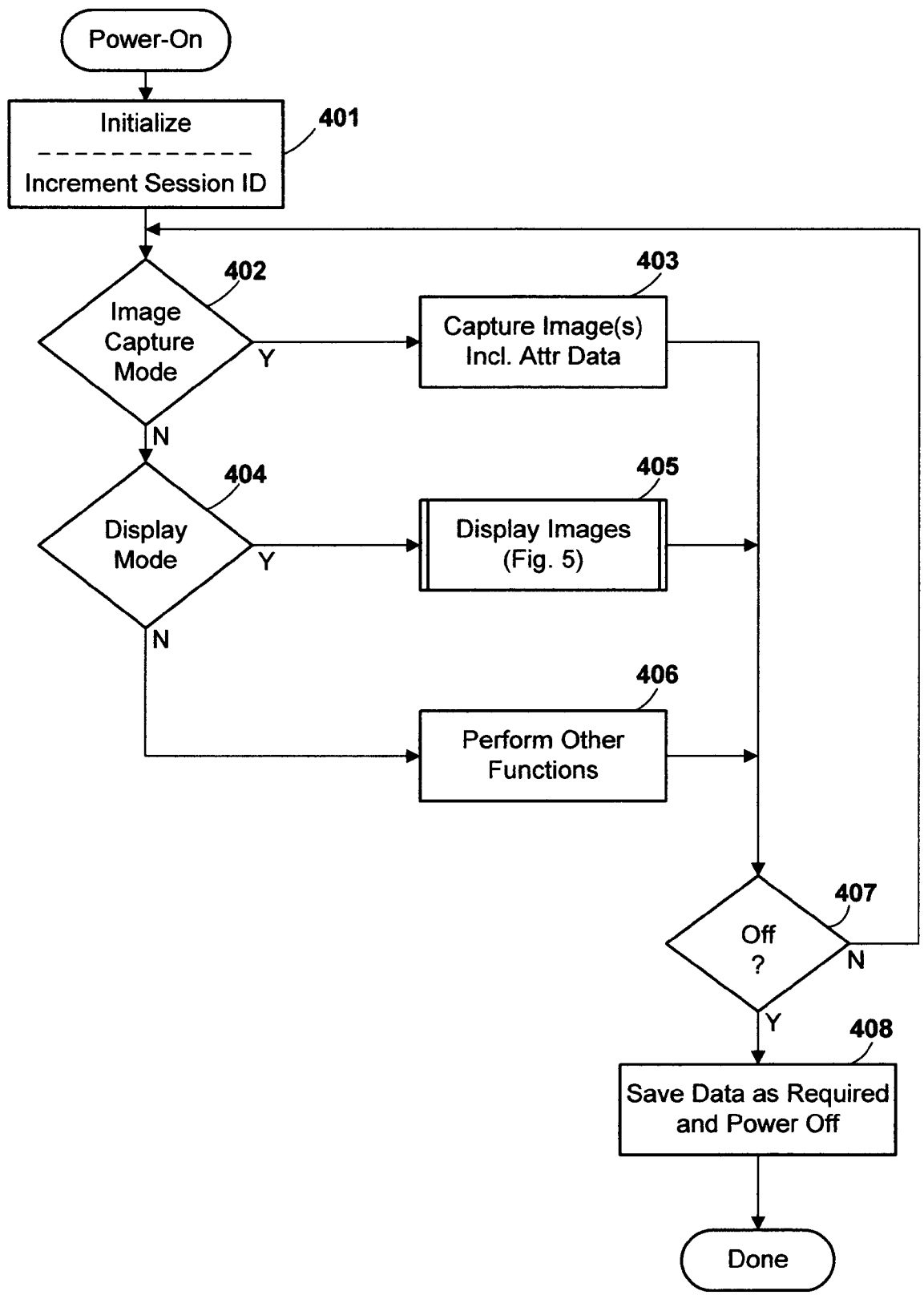
FIG. 4 is a high-level flow diagram showing certain aspects of the operation of a control program for controlling the operation of a digital camera, according to the preferred embodiment.

FIG. 4 is a high-level flow diagram showing certain aspects of the operation of control program 211 for controlling the operation of camera 102 according to the preferred embodiment. Certain conventional operations of a camera control program, not necessary to an understanding of the present invention, have been omitted from FIG. 4 and subsequent figures, or represented in greatly simplified form, for clarity of illustration.

Referring to FIG. 4, the camera has multiple operating modes, of which the two most significant are the image capture mode and the display mode. The user selects an appropriate operating mode, as by means of one or more special mode switches on the camera body, by selection of items from a displayed menu, or by other means. Upon power-on, control program 211 initializes itself, loading previously saved data to memory as required, allocating temporary variables, and so forth (step 401). In particular, the control program increments a session identifier used to uniquely identify a power-on session.

If the user selects the image capture mode of operation (the 'Y' branch from step 402), the control program then performs all appropriate functions necessary to capture one or more images (step 403). For example, typically optical sensor array 203 is activated; the image received from the optical sensor array is displayed on display 205, the range to the subject is calculated and the lens is focused accordingly (if autofocus is used), light is metered and exposure time/aperture computed, the shutter button is monitored, and, upon detecting that the user depresses the shutter, the image is captured. The numerous functions performed by the control program to capture one or more digital images are conventional in nature, and are not further described herein. However, in addition to any conventional attribute data which is saved with each captured image, such as a date/time stamp, camera settings, and so forth, the control program preferably saves the current power-on session identifier with each captured image, for later use in grouping of images. The user may capture a single image, or multiple images, in image capture mode, and when finished capturing images exits to step 407.

If the user selects the display mode of operation (the 'Y' branch from step 404), the control program then displays one or more previously captured and stored images on display 205. The displaying of captured images is represented at a high level in FIG. 4 as block 405, and is shown in greater detail in FIG. 5. When the user is finished displaying images, the control program exits to step 407.

If the user has selected neither the image capture mode nor the display mode, the 'N' branch is taken from step 404, and the control program performs other functions appropriate to the mode selected (step 406). Other operating modes may include, for example: a data download mode in which stored images and other data are downloaded via a cable or wireless link to another digital device; a menu mode in which the user can select functions from a menu displayed on display 205; etc. Generally, these other operating modes and functions are conventional in nature, and are not described in detail herein. When the user is finished in the applicable mode, the control program exits to step 407.

Step 407 represents a mode change or a power off. If the user selects a mode change (the 'N' branch from step 407), the control program changes mode and returns to step 402 to perform functions appropriate to the newly selected mode. If the user selects a power-off, any volatile data required to be saved is saved in non-volatile memory or storage, and the camera is powered-off (step 408).

Figure 5A:
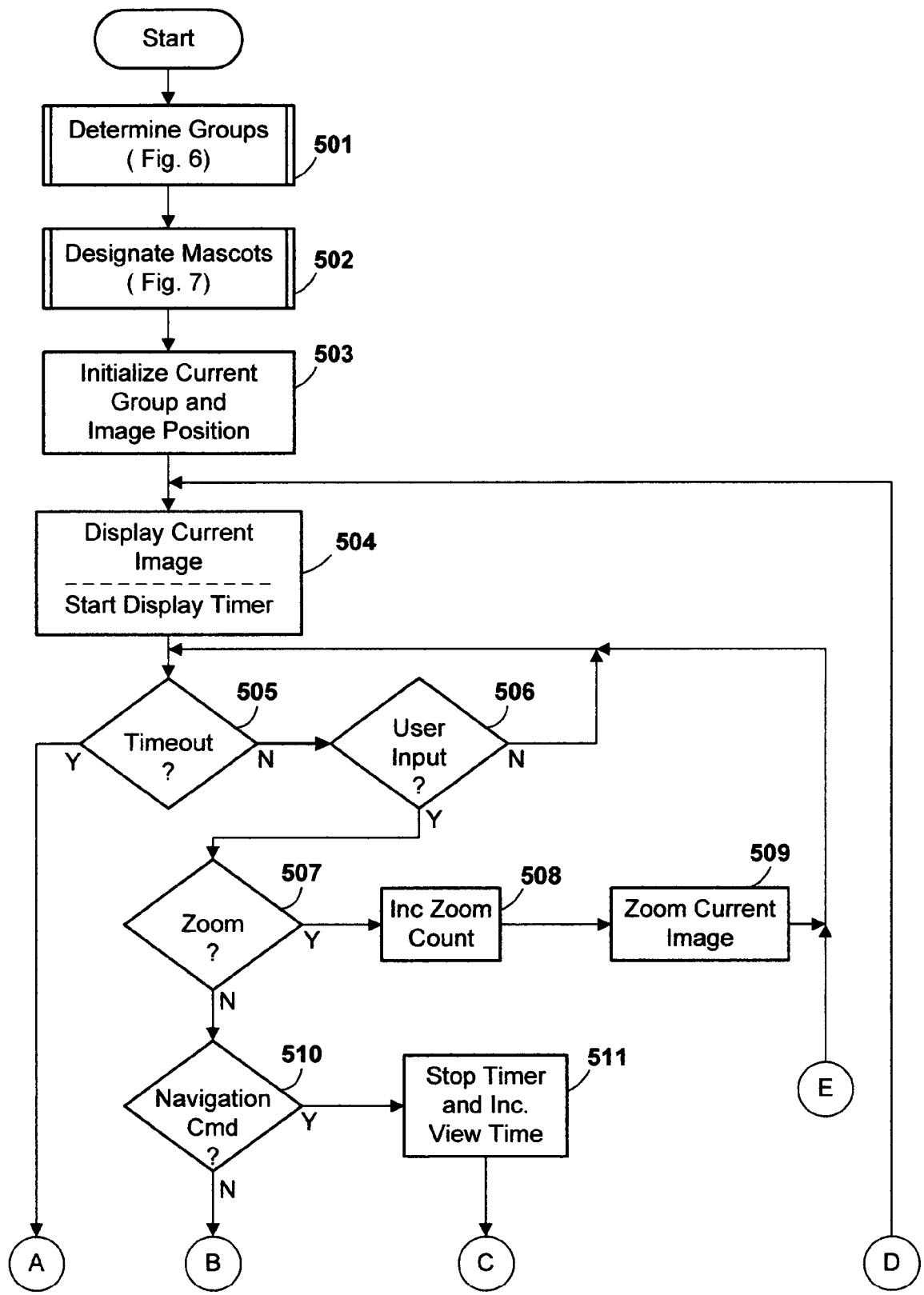
FIGS. 5A and 5B (herein collectively referred to as FIG. 5) are a flow diagram showing in greater detail the operation of a digital camera control program in display mode, according to the preferred embodiment.
Figure 5B:
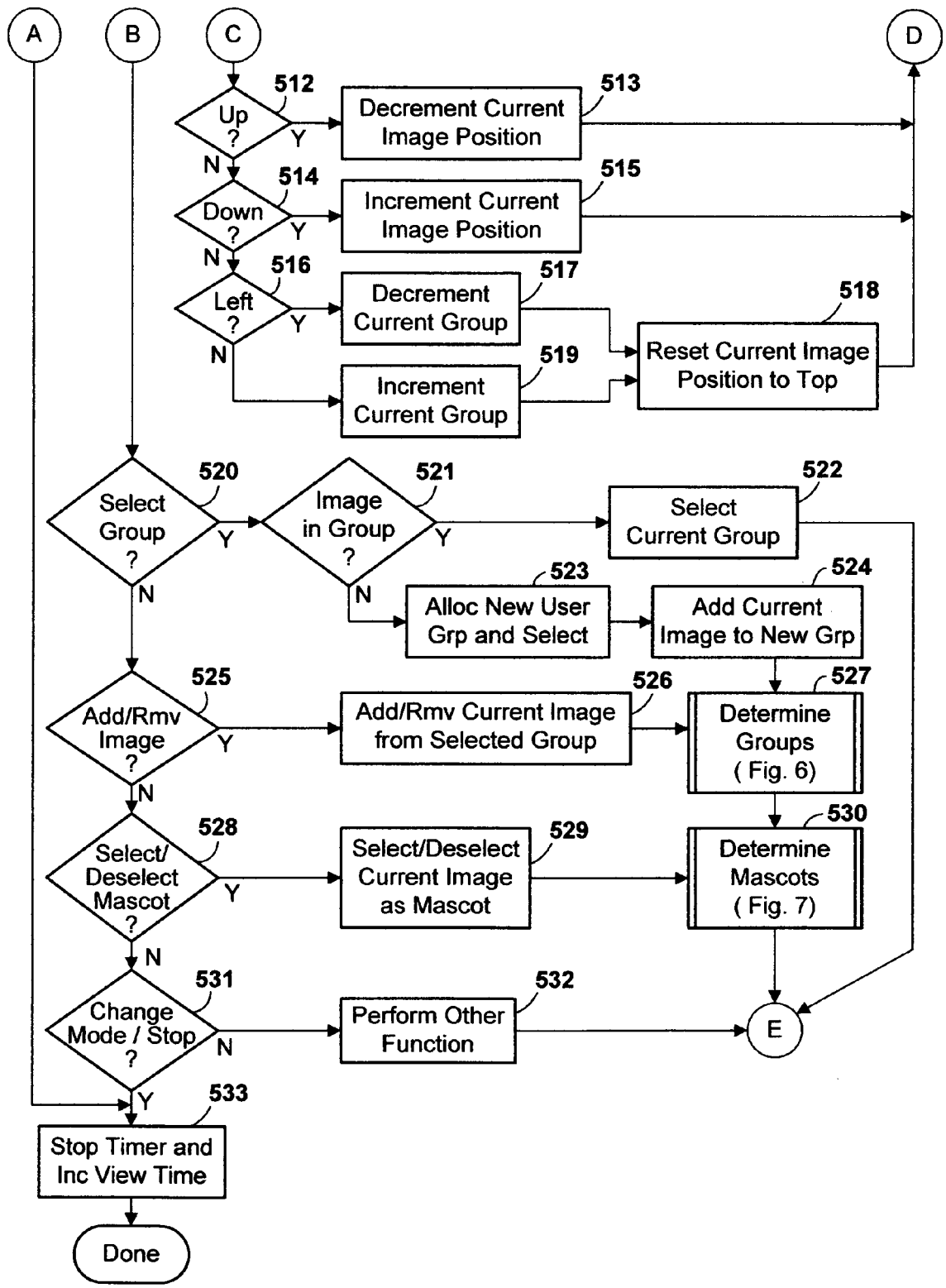

FIGS. 5A and 5B (herein collectively referred to as FIG. 5) are a flow diagram showing in greater detail the operation of control program 211 in display mode, represented generally as step 405 in FIG. 4, according to the preferred embodiment. Referring to FIG. 5, upon entering display mode the control program invokes image grouping function 212 to assign each respective image to a corresponding image group. The assigning of images to groups is represented generally in FIG. 5 as block 501, and is shown in greater detail in FIG. 6, discussed below. The control program further invokes mascot determination function 213 to designate a respective mascot from each group of images determined in step 501. The designation of mascots is represented generally in FIG. 5 as block 502, and is shown in greater detail in FIG. 7, discussed below.

Control program 211 initializes a current group and image position within that group for displaying an initial image, according to some viewing convention (step 503). The initial current group could be the most recently acquired group of images, or the oldest group of images, or the most recently viewed group of images, or some other convention. The initial position within a group is typically the mascot position, i.e. the first position within the group, but it could be some other position (e.g., the last image which was viewed).

The control program then displays the current image on display 205, i.e., it displays the image within the current group corresponding to the currently selected image position (step 504). When an image is displayed, the control program sets a display timer to time the length of time that the image remains on the display.

The control program then waits for a user input, and continues to display the image while waiting for a user input and checking a user input timer, represented as the loop at steps 505 and 506. The user input timer will time out after a sufficiently long viewing time without any user input (e.g., 1 minute), which could be a user selectable parameter. If the user input timer times out (the 'Y' branch from step 505), then it is assumed that the user is no longer looking at the camera, and the control program proceeds to step 533 to update the accumulated viewing time in attribute data 214 and exit display mode. If a user input is received before timeout, the 'Y' branch is taken from step 506.

If the received user input is a zoom command, the 'Y' branch is taken from step 507. The control program then increments a zoom operations counter in attribute data 214 associated with the image being displayed (step 508). The program performs the requested zoom function by either zooming in or zooming out, as the case may be (step 509), and returns to the user input loop at steps 505 and 506.

If the received user input is an image navigation command for selecting another image (any of the arrow keys in the scroll function input buttons), the 'Y' branch is taken from step 510, and the control program processes the navigation input, shown generally as steps 511-519. The display timer is stopped and the cumulative viewing time of the currently displayed image in attribute data 214 is incremented according to the amount of time the image has been displayed (step 511). The amount of the increment could be the total elapsed time on the display timer, but it is preferably the total elapsed time less some fixed constant (such as 1 sec), but not less than zero. By subtracting a small fixed constant, one avoids accumulating viewing time when the image is simply passed over while navigating to other images.

If the received user input is the 'up arrow' scroll function input button (the 'Y' branch from step 512), the current image position within the current group is decremented (step 513). I.e., the current image group does not change, but the position within the group is decremented by one, which will cause the camera to display the previous image within the current group, i.e. go up the stack (when it returns to step 504). If the current image is the mascot (top of stack), the camera will wrap to the bottom of the stack and display the last image of the group. The control program then proceeds to step 504 to display the new current image.

If the received user input is the 'down arrow' scroll function input button (the 'Y' branch from step 514), the current image position within the current group is incremented (step 515). I.e., the current image group does not change, but the position within the group is incremented by one, which will cause the camera to display the next image within the current group, i.e. go down the stack (when it returns to step 504). If the current image is the last image (bottom of stack), the camera will wrap to the top of the stack and display the mascot image of the group. The control program then proceeds to step 504 to display the new current image.

If the received user input is the 'left arrow' scroll function input button (the 'Y' branch from step 516), the current group is decremented by one (step 517), and the current position is reset to the mascot position at the top of the stack (step 518). This will cause the camera to display the mascot image from the previous group (when it returns to step 504). If the current group is the first group, then the camera will wrap to the last group and display the mascot from the last group. The control program then proceeds to step 504 to display the new current image.

If the 'N' branch is taken from step 516, then the only remaining possibility is that the received user input is the 'right arrow' scroll function input button. In this case, the current group is incremented by one (step 519), and the current position is reset to the mascot position at the top of the stack (step 517). This will cause the camera to display the mascot image from the next group (when it returns to step 504). If the current group is the last group, then the camera will wrap to the first group and display the mascot from the first group. The control program then proceeds to step 504 to display the new current image.

In the preferred embodiment, the user has the option of overriding any grouping or mascot selection made automatically by the control program, although it would alternatively be possible to not provide such a capability. To employ this option, the user manually designates groupings or mascots while in display mode. Manual groupings are performed by first navigating to any image within a user-designated group, and selecting a "select group" function to select the group, using any appropriate combination of input keys. If the image is not in a user-designated group, it is assumed to be the first image of a new user-designated group of images. The user then navigates to any arbitrary image, and selects an "add to group" function (using any appropriate combination of input keys), which causes the image to be added to the selected group. The user may add an arbitrary number of images to the selected group in this manner. A user designates a mascot for a group by navigating to the mascot and selecting a "designate as mascot" function (using any appropriate combination of input keys). The user may delete an image from a group, or de-select a previously selected mascot, in the same manner. These functions are represented generally as steps 520-530.

Referring again to FIG. 5, if the user navigates to an image (the camera displays the image) and the user inputs a "select group" function, the 'Y' branch is taken from step 520. If the current image is already a member of a user-specified group (as indicated by a non-null value in the user-specified group ID field of attribute data 214 for the current image), the 'Y' branch is taken from step 521, and the user-specified group of the current image becomes the "selected" group (step 522). The control program then returns to the loop at steps 505-506 to await further input. If, at step 521, the current image is not a member of a user-specified group, then a new user-specified group identifier is allocated (step 523), and this new group becomes the "selected" group. The current image is added to this new group by updating the user-specified group ID field in attribute data to the identifier of the new group (step 524). The control program then invokes the group determination function (step 527) and mascot designation function (step 530) to update the groupings and mascots, which could have changed as a result of the new group. The control program then returns to the idle loop at steps 505-506.

If the user inputs an "add to group" (or "remove from group") function, the 'Y' branch is taken from step 525. The current image is then added to the selected group (or removed from the selected group) by updating the user-specified group ID field in attribute data accordingly (step 526). The control program then invokes the group determination function (step 527) and mascot designation function (step 530) to update the groupings and mascots, which could have changed as a result of the addition/removal, and returns to the idle loop at steps 505-506. If no group was previously selected, then the user selection of "add to group" is ignored or produces an error message to the user.

If the user inputs a "designate as mascot" (or "de-select as mascot") function, the 'Y' branch is taken from step 528. The current image is then designated a mascot (or de-selected as a mascot) by updating the user-specified mascot flag in attribute data accordingly (step 529). The control program then invokes the group mascot designation function (step 530) to update the mascots, which could have changed as a result of the designation/de-selection, and returns to the idle loop at steps 505-506.

If the 'N' branch is taken from step 528, then the user input some other selection not discussed above. Such a selection could have been a selection to change mode or power-down the camera (indicated by the 'Y' branch from step 531), or some other function. If the 'N' branch is taken from step 531, the appropriate function is performed (step 532), and the control program returns to the idle loop at steps 505-506. If the 'Y' branch is taken from step 521, the display timer is stopped and the cumulative viewing time of the image is incremented (step 533), as explained above with respect to step 511. The control program then exits to step 407 of FIG. 4.

Figure 6:
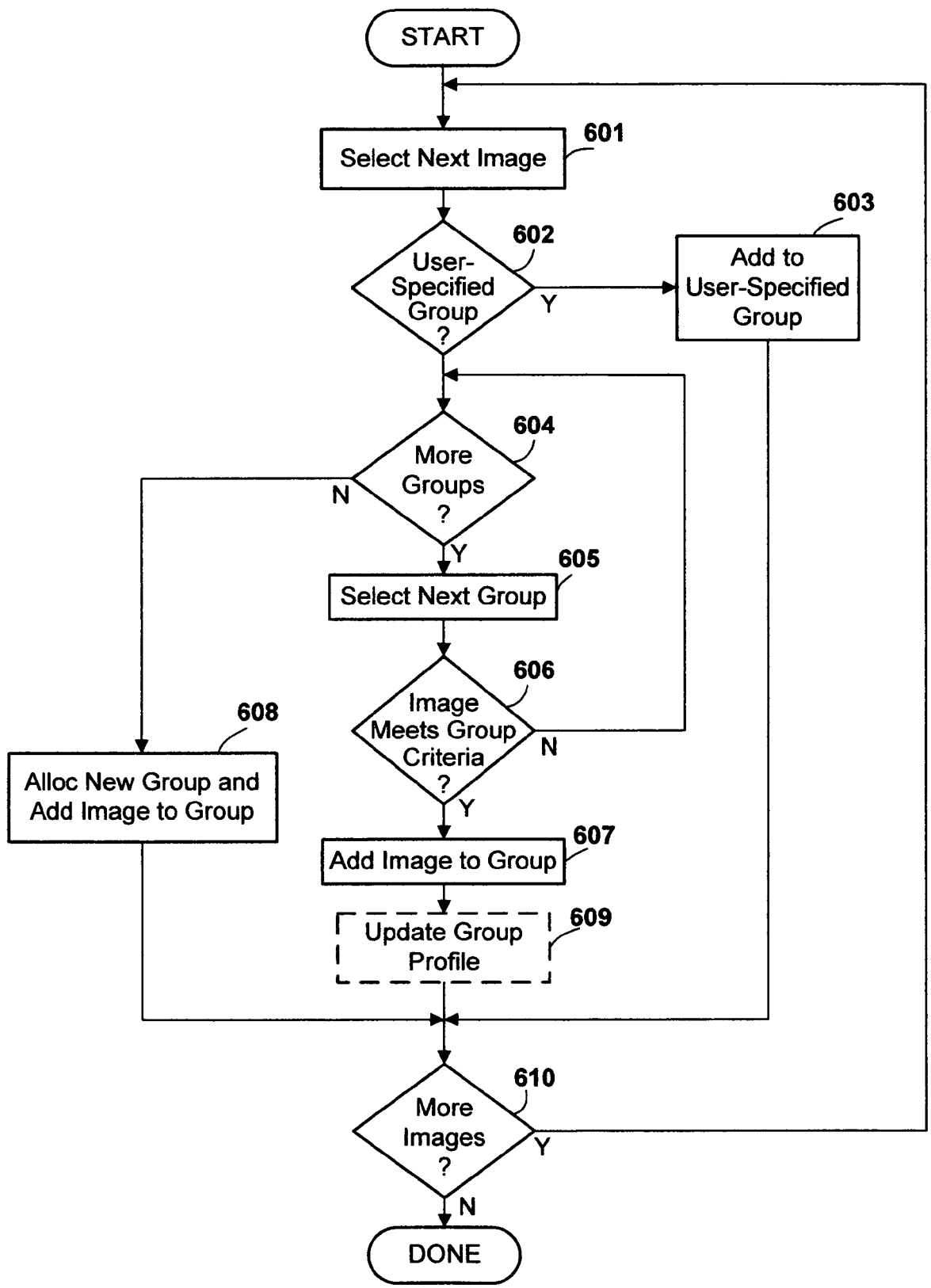
FIG. 6 is a flow diagram showing in greater detail the process of automatically assigning images to respective groups, according to the preferred embodiment.

FIG. 6 is a flow diagram showing in greater detail the process of automatically assigning images to respective groups, represented generally as either step 501 or 527 in FIG. 5, according to the preferred embodiment. The control program considers each image in sequence and determines an appropriate group for the image (or creates a new one). The assignment may be recorded in memory using any of various conventional means, e.g., by creating lists in which each member of a group contains a pointer to the next member, by placing indexes in arrays, etc.

Referring to FIG. 6, the control program selects a next image from a sequential list of images, e.g., in the order the images were captured (step 601). If the selected image belongs to a user-specified group (as indicated by a non-null value in user-specified group ID of the attribute data), the 'Y' branch is taken from step 602, and the image is assigned to the corresponding user specified group (step 603).

If the selected image does not belong to a user-specified group, each group is selected in turn and the grouping function determines whether the image meets the appropriate group criteria. As shown in FIG. 6, if any more groups remain to be considered, the 'Y' branch is taken from step 604. A next group is then selected (step 605). The attribute data or other data of the selected image is then compared with one or more attributes of the selected group to determine whether the selected image belongs in the group (step 606). If not, the 'N' branch is taken from step 606, and the control program returns to step 604. If the selected image belongs in the group, the 'Y' branch is taken from step 606, and the image is added to the group (step 607).

In the preferred embodiment of the present invention, the only criterion used at step 606 for determining group membership (other than a user-specified group) is the session identifier. All images having the same session identifier are grouped together (other than images which the user specifies belong to a user-specified group), and no images having different session identifiers are grouped together. Thus, a simple test for group membership is used. However, it would alternatively be possible to use more complex tests for membership in the group. One such alternative, which is particularly useful where no session identifier data is available but is useful in other circumstances as well, is the time elapsed between capture of the current image and the immediately preceding image, as indicated by comparing the timestamp of the current image with that of a previous image. If this time interval is sufficiently short, it can be assumed that the two images should be grouped together. It would also be possible to use a combination of factors, as explained in greater detail herein. In general, one or more attributes of a group will be compared with a selected image at step 606 to determine whether the selected image should be added. In some cases, these attributes represent averages or values which otherwise change as new members are added to the group. Where the attributes of a group can change, the group's profile should be updated every time a new member is added, as represented by optional step 609 in FIG. 6.

If all groups have been compared with the currently selected image and the image does not meet the criteria for inclusion in any of the groups, the 'N' branch from step 604 is taken, and a new group is allocated, with the selected image being its only member (step 608).

If more images remain to be examined, the 'Y' branch is taken from step 610, to select a next image at step 601. When all images have thus been considered, the 'N' branch is taken from step 610 and the grouping function is complete.

Figure 7:
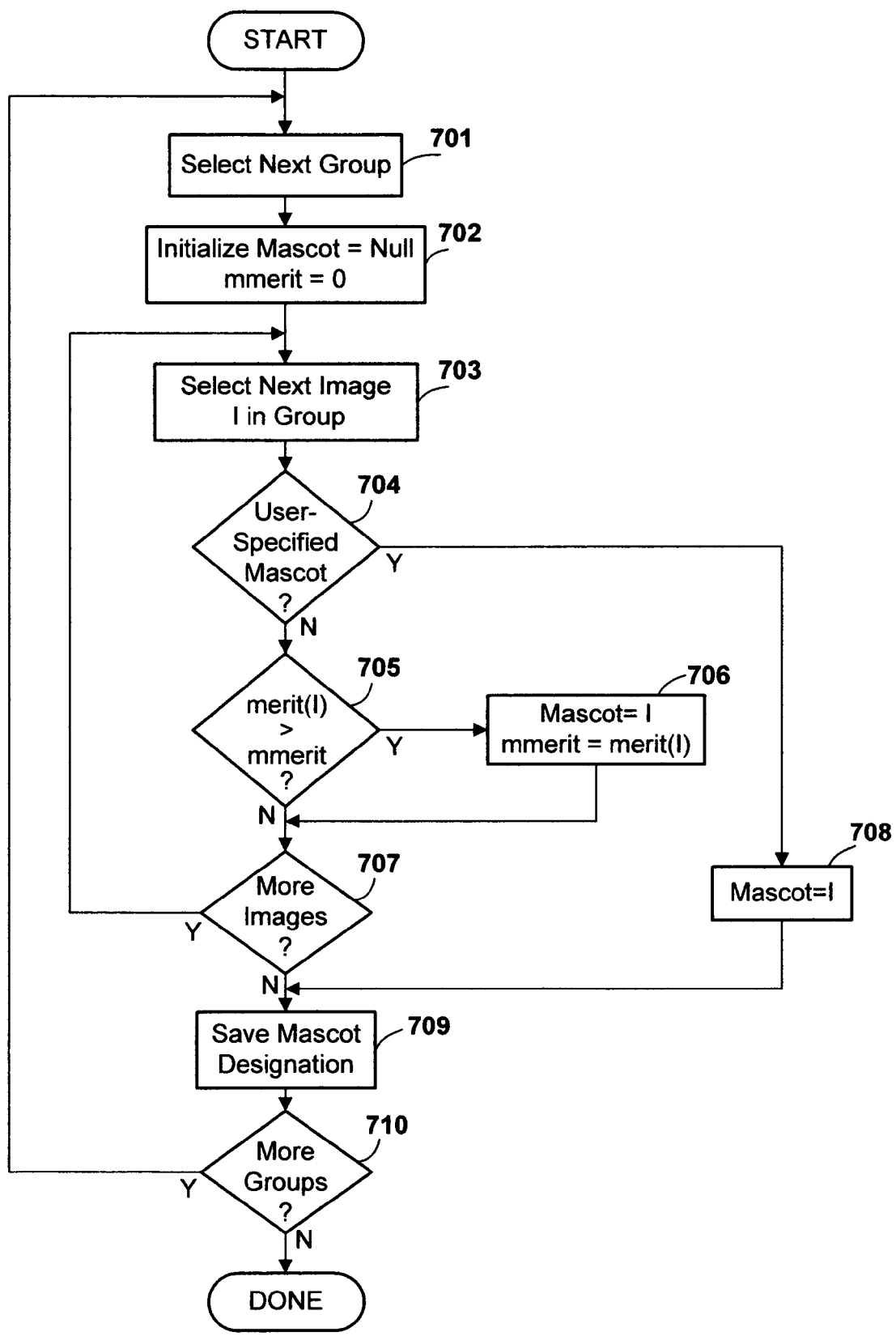
FIG. 7 is a flow diagram showing in greater detail the process of automatically designating a respective mascot from among the images in each group, according to the preferred embodiment.

FIG. 7 is a flow diagram showing in greater detail the process of automatically designating a respective mascot from among the images in each group, represented generally as either step 502 or 530 in FIG. 5, according to the preferred embodiment. The control program considers each group in sequence and determines an appropriate mascot. The group mascot thus determined is preferably placed at the top or beginning of a list of images in the group.

Referring to FIG. 7, the control program selects a next group from a list of groups allocated previously by the grouping function (step 701). A pair of temporary variables are initialized, being a mascot, which is initialized to null, and a merit value 'mmerit' for the mascot, which is initialized to zero (step 702) The control program then selects a next image within the selected group (step 703), designated image I. If image I is a user-specified mascot (as indicated by the mascot flag of the attribute data), the 'Y' branch is taken from step 704, and the temporary variable mascot is set to the value of I (step 708), by-passing any further search for a mascot.

If the selected image I is not a user-specified mascot, a merit score for image I (merit(I)) is computed and compared with mmerit (step 705). If merit(I) exceeds mmerit, the 'Y' branch is taken from step 705, and mascot is set to I, while mmerit is set to merit(I) (step 706). These temporary variables thus hold the "best" mascot so far encountered in searching through members of the group.

In the preferred embodiment, a merit score is derived from the history of user interaction with the stored camera images, and in particular, is computed as a function of the cumulative viewing time of the image and the zoom count of the image, as recorded in attribute data 214, i.e.

$$merit(I)=C1*(Cumulative\_View\_Time)+C2*(Zoom\_Count),$$

where C1 and C2 are appropriately chosen coefficients, which could be user programmable.

It will be understood that other or additional criteria could be used for selecting a mascot image.

If there are any more images in the group to be considered, the 'Y' branch is taken from step 707, and a next image is selected at step 703. When all images in the group have thus been considered, the 'N' branch is taken from step 707. The value of mascot is then the chosen mascot for the group, and this status is appropriately saved (step 709). In the preferred embodiment, the status of a mascot is effectively recorded by placing the chosen mascot image at the top of the stack or head of the list of images in the group, so that it is displayed first when the group is selected.

If any more groups remain for which a mascot has not been designated, the 'Y' branch is taken from step 710, and a next group is selected at step 701. When all groups have thus been considered, the 'N' branch is taken from step 710 and the mascot designating function is complete.

In the preferred embodiment, images are automatically grouped primarily according to the camera power on/off session, and mascots are selected primarily according to cumulative viewing time and number of zoom operations. These are rather basic criteria for grouping of images and selecting mascots that can be implemented using even very limited memory and processing capabilities in the camera. However, it will be appreciated that other, more sophisticated techniques could alternatively be used for grouping of images and selection of mascots, in accordance with the present invention. Some examples of such alternatives follow, it being understood that these are only some examples and are not intended as an exhaustive list of possible alternative implementations.

It would be possible to characterize images using color analysis or image analysis, and to group like images together using the results of such analysis, either alone or in conjunction with other grouping criteria. For example, images which show a similar color pattern and which are captured at approximately the same time (either the same session, or within some time interval according to the date/time stamps on the images) might be grouped together, while images which show little color resemblance might not be grouped notwithstanding that they are taken at approximately the same time (and similarly for images taken at substantially different times). It would also be possible to place a global positioning system and/or a directional indicator (such as a compass) in the camera, and to record the global coordinates and/or direction of the camera when the image is taken as additional attributes to be used for grouping images. Other or additional criteria might also be used for the selection of a mascot image; for example, if the camera lens was zoomed when the image was captured, this might indicate an image of greater importance which should be given some priority as a mascot.

It would further be possible to automatically group images according to any of multiple different alternative criteria, the criteria being user-selectable. For example, a user might select among the choices of grouping by date, in which all images taken on the same date are grouped together; or grouping by session identifier, in which all images taken during the same session are grouped together, or grouping by some other factor or combination of factors. Such a grouping selection by the user does not require any change to the underlying attribute data, so that the same attribute data can support multiple different groupings. This user selection can be made at the time the images are displayed or some other time after the images are captured, and could be changed by the user from time to time, so that the same set of images can be grouped differently at different times, depending on the wishes of the user. Responsive to such a user selection, the camera would examine the attribute data of the various images and group images according to the specified criteria.

A particular image navigation method is described above and represented conceptually in FIG. 3, but it should be understood that various alternative navigation methods are possible according to the present invention. In a general sense, a digital device (or devices) automatically groups images, and provides the user with at least two alternative navigation options. In a first navigation option, some images are skipped over, i.e. the device displays at least one image from each group, but for at least some groups, does not display all the images within the group. In a second navigation option, successive images are displayed, so that all images in a group can be viewed. Either of these options could be implemented somewhat differently than described herein as a preferred embodiment. For example, the first option might successively display the first N images of each group, and skip to the next group if there are more than N images in any group. Alternatively, instead of always displaying a mascot image of a next group, the first option might skip to an image at the current stack position. E.g., when viewing the $3^{rd}$ image in stack N, selection of the first option would cause the $3^{rd}$ image in stack (N+1) to be displayed. Similarly, the second navigation option could cause the device to scroll to the next group when at the bottom of a stack; i.e., in this alternative, selecting the second option when displaying the last image of a group will cause the first image of the next group to be displayed. Other variations are possible.

In the preferred embodiment, one or more digital data devices automatically assign images to groups, and automatically select a mascot for each group. However, it would alternatively be possible for one of these steps to be performed manually. E.g., the device could automatically assign images to groups, but rely on user input for selecting a mascot (or always select the first image of the group as the mascot). Alternatively, the device could rely on user input to define the group, but automatically select the mascot based on history of user interaction or other factors.

In general, the routines executed to implement the illustrated embodiments of the invention, whether implemented within camera 102 or some other digital data processing device as part of an operating system or a specific application, program, object, module or sequence of instructions are referred to herein as "programs" or "control programs". The programs typically comprise instructions which, when read and executed by one or more processors in the devices or systems consistent with the invention, cause those devices or systems to perform the steps necessary to execute steps or generate elements embodying the various aspects of the present invention. Moreover, while the invention has and hereinafter will be described in the context of fully functioning camera apparatus, the various embodiments of the invention are capable of being distributed as a program product in a variety of forms, and the invention applies equally regardless of the particular type of signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network, including a wireless network. Examples of signal-bearing media is illustrated in FIG. 2 as memory 202 and as media 208.

Although a specific embodiment of the invention has been disclosed along with certain alternatives, it will be recognized by those skilled in the art that additional variations in form and detail may be made within the scope of the following claims:

What is claimed is:

1. A method for displaying a plurality of digitally stored images, comprising the steps of:

selecting, with respect to each image of a plurality of digitally stored images, a respective group of a plurality of groups of said digitally stored images, and assigning each said image of said plurality of digitally stored images to the respective selected group, said selecting and assigning being performed automatically by a digital data processing device;

designating a respective mascot image from each said group of said plurality of groups of said digitally stored images, said designating a respective mascot step being performed automatically by a digital data processing device, wherein said step of designating a respective mascot image from each group comprises designating a respective mascot image based on a history of user interaction with said plurality of digitally stored images without including user interaction for selecting a mascot image manually by a user;

displaying successive images of said plurality of images on a display of a digital data processing device responsive to user navigation input selections, only one image at a time being displayed on said display, wherein said user navigation input selections include a first next image input selection and a second next image input selection, wherein receiving said first next image input selection from a user while displaying a first image in a first group of images on said display causes an image from a next group of images to be displayed on said display, and wherein receiving said second next image input selection from a user while displaying said first image in a first group of images on said display causes a next image within said first group of images to be displayed on said display;

wherein receiving said first next image input selection from a user while displaying said first image in said first group of images on said display causes the designated mascot image from said next group of images to be displayed on said display.

2. The method for displaying a plurality of digitally stored images of claim 1, wherein said assigning step and said displaying step are performed by the same digital data processing device.

3. The method for displaying a plurality of digitally stored images of claim 2, wherein said digital data processing device is a digital camera which captures said digitally stored images.

4. The method for displaying a plurality of digitally stored images of claim 1, wherein said step of assigning each image to a respective group comprises assigning each image to a respective group using at least one of the set consisting of: (a) a respective power-on session identifier associated with each image; and (b) a respective timestamp associated with each image.

5. The method for displaying a plurality of digitally stored images of claim 1, wherein said user navigation input selections further include a first previous image input selection and a second previous image input selection, wherein receiving said first previous image input selection from a user while displaying said first image in said first group of images on said display causes an image from a previous group of images to be displayed on said display, and wherein receiving said second previous image input selection from a user while displaying said first image in a first group of images on said display causes a previous image from said first group of images to be displayed on said display.

6. The method for displaying a plurality of digitally stored images of claim 1, wherein receiving said second next image input selection while displaying a last image of a group causes a first image of the group to be displayed on said display.

7. A program product for displaying a plurality of digitally stored images, comprising:
a plurality of instructions tangibly recorded on computer-readable media and executable by at least one digital data processing device, wherein said instructions, when executed by at least one digital data processing device, cause the at least one digital data processing device to perform the steps of:
automatically designating a respective mascot image from each group of a plurality of groups of digitally stored images, at least some of said groups containing a plurality of digitally stored images, said automatically designating a respective mascot image being based on a history of user interaction with said plurality of digitally stored images without including user interaction for selecting a mascot image manually by a user;
displaying images of said plurality of images on a display of a digital data processing device responsive to user navigation input selections, wherein said user navigation input selections include a first input selection and a second input selection, wherein said first input selection causes the respective designated mascot image from at least one group of images to be displayed on said display, and wherein said second input selection causes at least one image which is not a mascot, said at least one image within a current selected group of images, to be displayed on said display.

8. The program product of claim 7, wherein said designating step, and said displaying step are performed by the same digital data processing device.

9. The program product of claim 7, wherein said plurality of instructions further cause the at least one digital data processing device to perform the step of automatically assigning each said digitally stored image to a respective said group of said digitally stored images.

10. The program product of claim 9, wherein said step of automatically assigning each image to a respective group comprises assigning each image to a respective group using at least one of the set consisting of: (a) a respective power-on session identifier associated with each image; and (b) a respective timestamp associated with each image.

11. The program product of claim 7, wherein said user navigation input selections cause only one image at a time to be displayed on said display, said user navigation input selections including a next group input selection, a next image input selection, a previous group input selection and a previous image input selection, wherein said next group input selection causes the designated mascot image from a next group of images to be displayed on said display, wherein said next image input selection causes a next image from a current group of images to be displayed on said display, wherein said previous group input selection causes the designated mascot image from a previous group of images to be displayed on said display, and wherein said previous image input selection causes a previous image from a current group of images to be displayed on said display.

12. The program product of claim 7, wherein receiving said second next image input selection while displaying a last image of a group causes a first image of the group to be displayed on said display.

13. A digital data apparatus for displaying digital images, comprising:
at least one processor;
a memory for storing processor-executable instructions;
a display for displaying digitally stored images; and
a display program comprising a plurality of instructions executable by said processor, said display program automatically selecting, with respect to each image of a plurality of digitally stored images, a respective group of a plurality of groups of said digitally stored images, and assigning each said image of said plurality of digitally stored images to the respective selected group;
wherein said display program displays images of said plurality of images on said display responsive to user navigation input selections, wherein said user navigation input selections include a first input selection and a second input selection, wherein, for at least a first subset of said digitally stored images, receiving said first input selection from a user while displaying a first image of the first subset causes said display program to display an image of a next group of images following the group to which the first image of the first subset belongs, and wherein receiving said second input selection from a user while displaying the first image of the first subset causes said display program to display at least one image from the group to which the first image of the first subset belongs other than the first image;
wherein said display program further comprises a mascot selection function for automatically designating a respective mascot image from each said group of said plurality of groups of said digitally stored images; and said designating a respective mascot step being performed automatically by a digital data processing device;
wherein said mascot selection function automatically designates a respective mascot image from each said group based on a history of user interaction with said plurality of digitally stored images without including user interaction for selecting a mascot image manually by a user;
wherein said next group input selection causes the designated mascot image from a next group of images to be displayed on said display.

14. The digital data apparatus of claim 13, wherein said digital data apparatus is a digital camera further comprising an optical sensor array for capturing said digital images.

15. The digital data apparatus of claim 13, wherein said display program automatically assigns each image to a respective group using at least one of the set consisting of:

(a) a respective power-on session identifier associated with each image; and (b) a respective timestamp associated with each image.

* * * * *